(12) United States Patent  (10) Patent No.: US 7,422,085 B2
Kitazawa  (45) Date of Patent: Sep. 9, 2008

(54) VEHICLE OCCUPANT PROTECTION SYSTEM

(75) Inventor: Kenji Kitazawa, Hikone (JP)

(73) Assignee: Takata Corporation, Tokyo (JP)

( * ) Notice: Subject to any disclaimer, the term of this patent is extended or adjusted under 35 U.S.C. 154(b) by 390 days.

(21) Appl. No.: 11/303,922

(22) Filed: Dec. 19, 2005

(65) Prior Publication Data

US 2006/0157968 A1    Jul. 20, 2006

(30) Foreign Application Priority Data

Dec. 20, 2004    (JP) ............................. 2004-368233

(51) Int. Cl.
*B60R 21/00*    (2006.01)
(52) U.S. Cl. .................. 180/268; 280/801.1; 701/45; 307/10.1
(58) Field of Classification Search ................ 180/268; 280/735, 808, 801.1, 806; 701/45; 307/10.1
See application file for complete search history.

(56) References Cited

U.S. PATENT DOCUMENTS

| 6,498,562 | B2 * | 12/2002 | Yano ....................... 340/457.1 |
| 6,729,427 | B1 | 5/2004 | Do |
| 6,737,819 | B2 | 5/2004 | Tanji |
| 6,827,308 | B2 | 12/2004 | Fujii et al. |
| 6,931,696 | B2 | 8/2005 | Lee et al. |
| 2002/0153189 | A1 * | 10/2002 | Young ....................... 180/268 |
| 2004/0226767 | A1 | 11/2004 | Martinez et al. |
| 2007/0040058 | A1 * | 2/2007 | Koide ....................... 242/374 |
| 2007/0187541 | A1 * | 8/2007 | Saito et al. .................. 242/374 |
| 2007/0282505 | A1 * | 12/2007 | Bolton et al. ................. 701/45 |
| 2007/0295852 | A1 * | 12/2007 | Midorikawa ............ 242/390.9 |

FOREIGN PATENT DOCUMENTS

| DE | 2 006 029 | 9/1971 |
| DE | 43 08 038 A1 | 9/1994 |
| EP | 1 078 828 A1 | 2/2001 |
| EP | 1 243 486 A1 | 9/2002 |
| EP | 1 400 420 A1 | 3/2004 |
| JP | 11-180200 A | 7/1999 |
| JP | 2001-63522 A | 3/2001 |
| JP | 2001-80455 A | 3/2001 |
| JP | 2004-243860 A | 9/2004 |

* cited by examiner

*Primary Examiner*—Ruth Ilan
*Assistant Examiner*—Drew J. Brown
(74) *Attorney, Agent, or Firm*—Foley & Lardner LLP

(57) ABSTRACT

A vehicle occupant protection system includes a buckle switch that senses the condition of wearing a seatbelt, a first detection circuit including a first switch that is in the open position when the seatbelt is in use and is in the closed position when the seatbelt is not in use, and a second detection circuit including a second switch that is in the closed position when the seatbelt is in use and in the open position when not in use. An ECU supplies power to the first or second detection circuit whose switch is in the open position. The ECU also controls a motor in response to a detection signal outputted from the first or second detection circuit that is supplied with power. The sleep mode of the ECU is canceled when the detection signal outputted from the first or second detection circuit that is supplied with power changes.

6 Claims, 8 Drawing Sheets

VEHICLE OCCUPANT PROTECTION SYSTEM

BACKGROUND

The present invention relates to an occupant protection system for protecting an occupant of a vehicle.

Vehicles such as cars are generally equipped with a seatbelt system for protecting an occupant in a car collision, etc. A seatbelt system includes a seatbelt, a spool for withdrawing or retracting the seatbelt, and a drive unit for driving the spool.

It is known in the art to provide a seatbelt system using a motor as a drive unit as disclosed in Japanese Unexamined Patent Application Publication No. 11-180200 (incorporated by reference herein).

The seatbelt system of the related art includes an electrical control unit (ECU) and a detector for sensing the condition. The control unit controls the motor in response to a detection signal outputted from the detector. For example, a buckle switch is provided to detect that a tongue has been inserted into a buckle or has been drawn out from the buckle (to determine whether the seatbelt is in use or not in use). When a detection signal indicates that the tongue has been inserted into the buckle and the buckle switch is turned on, the control unit drives the motor in the direction that retracts the seatbelt to remove the looseness of the seatbelt. When a detection signal indicates that the tongue has been drawn out from the buckle and the buckle switch is turned off, the control unit drives the motor in the direction that retracts the seatbelt to store the seatbelt.

Vehicles are often constructed such that a control unit shifts to a sleep mode even when an ignition switch is in an off position, to prevent the discharge of a battery.

When there is a need to make the control unit in a sleep mode execute a specified control operation, a wake-up signal is inputted to a wake-up-signal input terminal of the control unit. For example, in the case where the control unit of the above-described seatbelt system is in a sleep mode by turning off the ignition key, with the seatbelt under use, when the seatbelt comes into a nonuse condition, the seatbelt must be retracted by driving a motor. Accordingly, even with the control unit in a sleep mode, power is continuously supplied to the buckle switch that detects the wearing of the seatbelt to input the detection signal of the buckle switch to the wake-up-signal input terminal of the control unit.

Here, a switch (referred to as "a switch having an A-contact") is generally used as the buckle switch, which is in the closed position when the tongue is in engagement with the buckle (the seatbelt is in use) and in the open position when the tongue is out of engagement with the buckle (the seatbelt is not in use). Alternatively, a switch (referred to as "a switch having a B-contact") is used which is in the open position when the tongue is in engagement with the buckle (the seatbelt is in use) and in the closed position when the tongue is out of engagement with the buckle (the seatbelt is not in use).

In order to stably detect that the switch has shifted from the closed position to the open position, a current of several mA must be supplied to the switch in the closed position. In other words, when a switch having the A-contact is used as the buckle switch, a current of several mA must be supplied to the buckle switch when the seatbelt is not in use. On the other hand, when a switch having the B-contact is used as the buckle switch, a current of several mA must be supplied to the buckle switch when the seatbelt is in use.

Therefore, there is a need for a technique of reducing the current to be supplied to the detector as one of the measures to reduce the discharge current from the battery, and particularly, the discharge current when the control unit is in a sleep mode.

SUMMARY

According to one embodiment of the invention a vehicle occupant protection system comprises a protection system for protecting an occupant; a drive unit for driving the protection system; a detector for determining whether the protection system is in use or not in use; a controller for controlling the drive unit in response to a detection signal outputted from the detector; and a power unit including at least a battery. The detector has a first detection circuit including a first switch that is in an open position when the protection system is in use and is in a closed position when the protection system is not in use, and a second detection circuit including a second switch that is in the closed position when the protection system is in use and is in the open position when the protection system is not in use. Wherein a power supply from the power unit to the first detection circuit is stopped when the protection system is not in use, and the power supply from the power unit to the second detection circuit is stopped when the protection system is in use. The controller controls the drive unit in response to the detection signal outputted from the first detection circuit or the second detection circuit that is supplied with power.

According to another embodiment of the invention, the controller shifts to a sleep mode when sleep conditions are satisfied. The power supply to the first detection circuit is stopped when the protection system is not in use and the controller is in said sleep mode, and the power supply to the second detection circuit is stopped when the protection system is in use and the controller is in said sleep mode.

According to yet another embodiment of the invention, when the controller is in said sleep mode, said sleep mode is cancelled in response to a detection signal outputted from the first detection circuit or the second detection circuit that is supplied with power.

According to still another embodiment of the invention, the occupant protection system is a seatbelt capable of restraining an occupant to a vehicle seat; the drive unit generates driving force for retracting the seatbelt; and the first switch is in the open position when the seatbelt is in use and in the closed position when the seatbelt is not in use, and the second switch is in the closed position when the seatbelt is in use and in the open position when the seatbelt is not in use.

According to another embodiment of the invention, the detector further includes a third detection circuit and a fourth detection circuit. The first switch is in the open position when a tongue of the seatbelt is in engagement with a buckle and in the closed position when the tongue is out of engagement with the buckle, and the second switch is in the closed position when the tongue of the seatbelt is in engagement with the buckle and in the open position when the tongue is out of engagement with the buckle. The power supply to the first detection circuit is stopped when the tongue of the seatbelt is out of engagement with the buckle, and the power supply to the second detection circuit is stopped when the tongue of the seatbelt is in engagement with the buckle. The third detection circuit includes a third switch that is in the open position when the amount of withdrawal of the seatbelt is equal to or more than a set value and in the closed position when the amount of withdrawal of the seatbelt is less than the set value The fourth detection circuit includes a fourth switch that is in the closed position when the amount of withdrawal of the seatbelt is equal to or more than a set value and in the open position when the amount of withdrawal of the seatbelt is less than the set value. The power supply to the third detection circuit from the power unit is stopped when the amount of withdrawal of the seatbelt is less than the set value, and the power supply to the fourth detection circuit from the power unit is stopped when the amount of withdrawal of the seatbelt is equal to or more than the set value. The controller controls the drive unit in response to at least one of a detection signal outputted from one of the first detection circuit or the second detection circuit that is supplied with power and a detection signal outputted from the third detection circuit or the fourth detection circuit that is supplied with power.

According to yet another embodiment of the invention, a vehicle occupant protection system includes a protection system for protecting an occupant. The system includes a drive unit for driving the protection system; a detector for determining whether the protection system is in use or not in use; a controller for controlling the drive unit in response to a detection signal outputted from the detector; and a power unit including at least a battery. The detector has a first detection circuit including a first switch that is in the open position when the protection system is in use and is in the closed position when the protection system is not in use. The detector includes a second detection circuit including a second switch that is in the closed position when the protection system is in use and is in the open position when the protection system is not in use. A power supply from the power unit to the first detection circuit is stopped when the protection system is not in use, and the power supply from the power unit to the second detection circuit is stopped when the protection system is in use. The controller controls the drive unit in response to the detection signal outputted from the one of the first detection circuit or the second detection circuit that is supplied with power.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
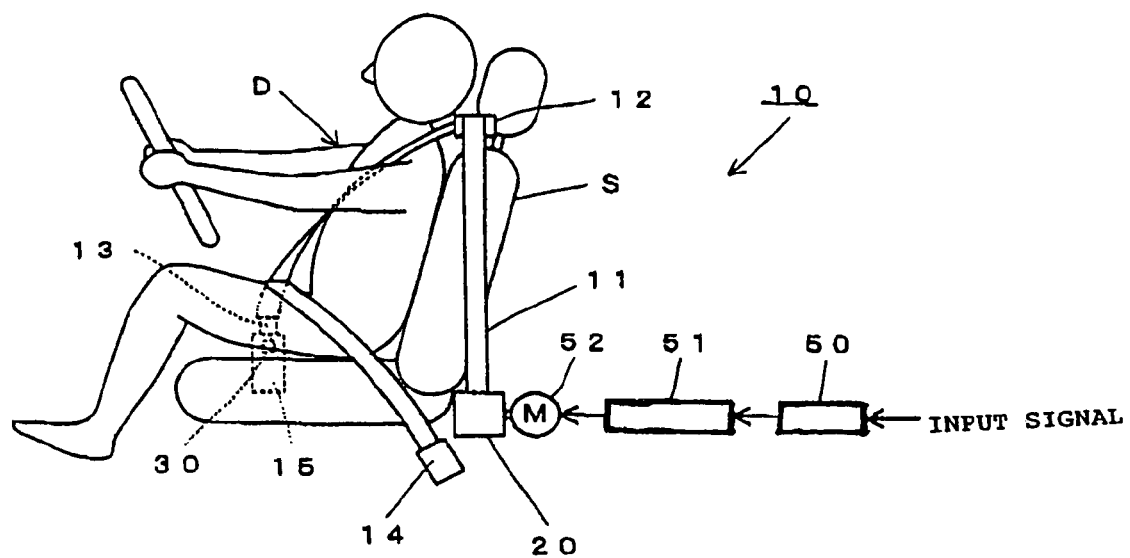
FIG. 1 is a diagram showing the schematic structure of a vehicle-mounted seatbelt system according to one embodiment of the invention.

Embodiments of the present invention will be described below with reference to the accompanying drawings. It should be understood that the following description is intended to describe exemplary embodiments of the invention, and not to limit the invention.

According to one embodiment of the invention, a vehicle occupant protection system comprises a protection system for protecting an occupant, a drive unit for driving the protection system, a detector for determining whether the protection system is in use or not in use, a controller for controlling the drive unit in response to a detection signal outputted from the detector, and a power unit including at least a battery.

The vehicle occupant protection system corresponds typically to a seatbelt that restrains an occupant seated in a car seat to the car seat in a car collision, and also includes an occupant protection system mounted to vehicles other than a car and an occupant protection system other than the seatbelt.

The detector of the invention has a first detection circuit including a first switch that is in the open position when the protection system is in use and is in the closed position when the protection system is not in use, and a second detection circuit including a second switch that is in the closed position when the protection system is in use and is in the open position when the protection system is not in use. Power supply to the first detection circuit is stopped when the protection system is not in use, and power supply to the second detection circuit is stopped when the protection system is in use. The controller controls the drive unit in response to the detection signal outputted from the one of the first detection circuit or the second detection circuit that is supplied with power.

When a seatbelt system is used as the protection system, the time when the protection system is in use and is not in use corresponds to the time when the tongue of the seatbelt is in engagement with the buckle and when out of engagement, and the time when the amount of withdrawal of the seatbelt is greater than or equal to a set value and when it is less than the set value. The power supply to the first detection circuit and the second detection circuit can be controlled by the control unit.

The period of suspension of the power supply to the first detection circuit or the second detection circuit may be part of the period during which the protection system is not in use (the period after the first switch comes to the closed position until it comes to the open position or the period after the second switch comes to the open position until it comes to the closed position) or part of the period during which the protection system is in use (the period after the first switch comes to the open position until it comes to the closed position or the period after the second switch comes to the closed position until it comes to the open position). However, the period of suspension is preferably close to all the periods.

It is also preferable that the system be constructed so that the state in which power supply to the first detection circuit is stopped and the state in which power supply to the second detection circuit is stopped do not occur at the same time.

According to another embodiment of the invention, the vehicle occupant protection system includes a controller, wherein the controller is constructed to shift to a sleep mode when sleep conditions are satisfied. The sleep conditions may include that the ignition key is in an off position and that a wake-up signal is not inputted to the wake-up-signal input terminal of the controller for more than a set time. Power supply to the first detection circuit is stopped when the protection system is not in use and the controller is in a sleep mode, and power supply to the second detection circuit is stopped when the protection system is in use and the controller is in a sleep mode. The period of suspension of the power supply to the first detection circuit or the second detection circuit may be part of the period during which the control unit is in a sleep mode. However, the period of suspension is preferably close to all the periods.

According to another embodiment of the invention, after the controller shifts to a sleep mode, the sleep mode is cancelled in response to a detection signal outputted from the one of the first detection circuit or the second detection circuit that is supplied with power. The method for canceling the sleep mode of the controller may include inputting a wake-up signal indicating that the detection signal outputted from the first detection circuit or the second detection circuit has changed to the wake-up-signal input terminal of the controller.

According to yet another embodiment of the present invention, the vehicle occupant protection system uses a seatbelt as the protection system, and a drive unit for retracting the seatbelt. The first switch is in the open position when the seatbelt is in use and in the closed position when the seatbelt is not in use. The second switch is in the closed position when the seatbelt is in use and in the open position when the seatbelt is not in use. The time when a seatbelt is in use includes the time during which the seatbelt is being withdrawn for use. It is preferable to use a drive unit capable of generating a driving force for retracting a seatbelt and a driving force for withdrawing the seatbelt. The drive unit is typically a motor.

When a motor is used as drive unit, the controller controls operation of the motor in the direction to retract the seatbelt and in the direction to withdraw the seatbelt. The mode in which the controller controls the drive unit in response to a detection signal from the one of the first detection circuit or the second detection circuit that is supplied with power includes a mode in which the controller cancels the sleep mode in response to a detection signal from the one of the first detection circuit or the second detection circuit that is supplied with power and controls the drive unit in response to a detection signal from the one of the first or second detection circuit that is supplied with power.

According to yet another embodiment of the present invention, in the vehicle occupant protection system the first switch is in the open position when the tongue of the seatbelt is engaged with a buckle. The first switch is in the closed position when the tongue is out of engagement with the buckle. The second switch is in the closed position when the tongue of the seatbelt is engaged with the buckle and in the open position when the tongue is out of engagement with the buckle. Power supply to the first detection circuit is stopped when the tongue of the seatbelt is out of engagement with the buckle. Power supply to the second detection circuit is stopped when the tongue of the seatbelt is engaged with the buckle.

The detector further includes a third detection circuit and a fourth detection circuit. The third detection circuit includes a third switch that is in the open position when the amount of withdrawal of the seatbelt is equal to or more than a set value and in the closed position when the amount of withdrawal of the seatbelt is less than the set value. The fourth detection circuit includes a fourth switch that is in the closed position when the amount of withdrawal of the seatbelt is equal to or more than a set value and in the open position when the amount of withdrawal of the seatbelt is less than the set value. The power supply to the third detection circuit is stopped when the amount of withdrawal of the seatbelt is less than the set value. The power supply to the fourth detection circuit is stopped when the amount of withdrawal of the seatbelt is equal to or more than the set value.

The controller controls the drive unit in response to at least one of a detection signal outputted from the one of the first detection circuit or the second detection circuit that is supplied with power and a detection signal outputted from the one of the third detection circuit or the fourth detection circuit that is supplied with power. The amount of withdrawal of the seatbelt denotes the amount of withdrawal of the seatbelt from a state in which it is wound around the outer circumference of the spool. The switch that closes or opens depending on the amount of withdrawal of the seatbelt may be a switch that closes or opens depending on the amount of the seatbelt retracted by the spool, or a switch that closes or opens depending on the tension applied to the seatbelt and so on.

According to another embodiment of the invention, a vehicle includes the vehicle occupant detection system as described below.

FIG. 1 shows the schematic structure of a seatbelt system according to an embodiment of the invention. As shown in FIG. 1, a seatbelt system 10 of this embodiment is a vehicle seatbelt system mounted to a car and principally includes a seatbelt 11, a retractor 20, a motor 52, and an electrical control unit (ECU) 50. The seatbelt 11 is a long belt (webbing) for use in restraining an occupant D seated in a vehicle seat S to the vehicle seat S.

The seatbelt 11 is withdrawn from the retractor 20 fixed to the vehicle. The middle of the seatbelt 11 is slidably supported by a shoulder guide anchor 12 disposed above the shoulder of the occupant D. The other end of the seatbelt 11 connects to an out anchor 14. A tongue 13 is provided in the portion of the seatbelt 11 between the shoulder guide anchor 12 and the out anchor 14. A buckle 15 is fixed to the vehicle body. The tongue 13 is inserted (fitted) into the buckle 15, so that the seatbelt 111 can be put on the occupant D.

Figure 3:
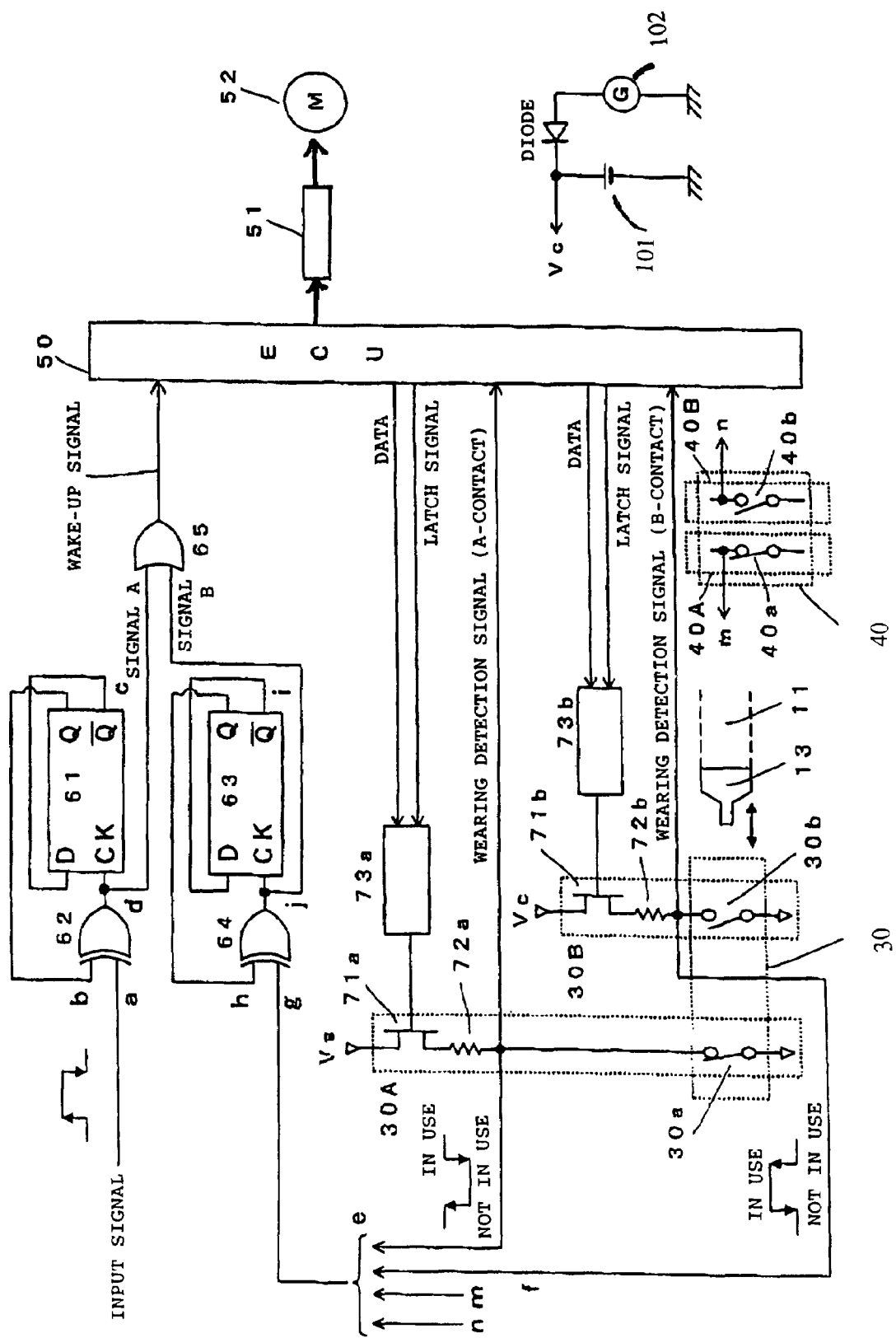
FIG. 3 is a diagram showing the schematic structure of the control system of the vehicle-mounted seatbelt system according to one embodiment of the invention.

The buckle 15 has a buckle switch 30 therein for detecting that the tongue 13 has been inserted, or that the seatbelt 11 has been put on. As shown in FIG. 3, the embodiment uses a buckle switch 30 having an A-contact 30a and a B-contact 30b. The A-contact 30a of the buckle switch 30 is a contact that is in the open position while the tongue 13 is inserted in the buckle 15 (when the seatbelt 11 is in use); and is in the closed position while the tongue 13 is not inserted in the buckle 15 (when the seatbelt 11 is not in use). On the other hand, the B-contact 30b is a contact that is in the closed position while the tongue 13 is inserted in the buckle 15 (when the seatbelt 11 is in use); and is in the opened position while the tongue 13 is not inserted in the buckle 15 (when the seatbelt 11 is not in use).

In this embodiment, the A-contact 30a of the buckle switch 30 corresponds to "a first switch" of the invention; the B-contact 30b of the buckle switch 30 corresponds to "a second switch" of the invention.

Figure 2:
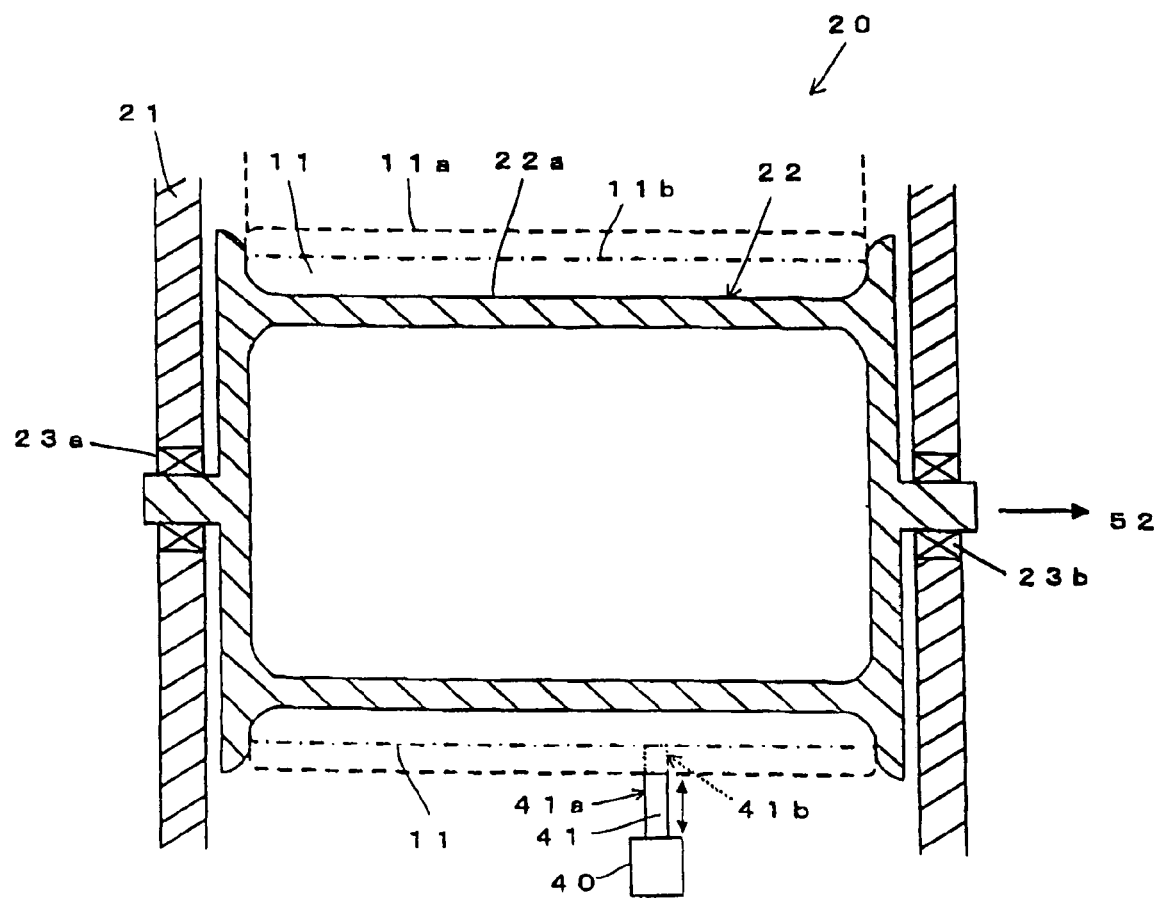
FIG. 2 is a cross-sectional view of the retractor in FIG. 1.

As shown in FIG. 2, the retractor 20 has a base frame 21 to be mounted to the vehicle body. The base frame 21 rotatably supports a spool (retractor) 22 with bearings 23a and 23b. Around the outer circumference 22a of the spool 22 is wound one end of the seatbelt 11. The spool 22 connects to the drive shaft of the motor 52. Thus, for example, the seatbelt 11 is wound out (withdrawn) from the spool 22 by the rotation of the motor 52 in one direction, and is retracted by the spool 22 by the rotation of the motor 52 in the other direction. Also, the withdrawal and retraction of the seatbelt 11 are prevented by locking the motor 52.

A withdrawal-amount sensing switch 40 is also provided which senses the amount of withdrawal of the seatbelt 11 when the seatbelt 11 is retracted from the spool 22. As shown in FIG. 2, the embodiment uses a switch as the withdrawal-amount sensing switch 40, which includes a moving part 41 on the outer surface of the seatbelt 11 retracted by the spool 22, the moving part 41 being biased in the direction to come into contact with the outer surface of the seatbelt 11 by an elastic body such as a spring (not shown). As shown in FIG. 3, the withdrawal-amount sensing switch 40 includes an A-contact 40a and a B-contact 40b as with the buckle switch 30.

The A-contact 40a of the withdrawal-amount sensing switch 40 is a contact that is in the open position when the amount of withdrawal of the seatbelt 11 is greater than a set value and in the closed position when it is less than the set value. More specifically, the A-contact 40a is in the closed position until the moving part 41 of the withdrawal-amount sensing switch 40 comes from a position 41a corresponding to a state in which the seatbelt 11 is retracted by the spool 22 (refer to the outer surface 11a in FIG. 2) to a position 41b corresponding to a state in which the seatbelt 11 is withdrawn by a set amount (refer to the outer surface 11b in FIG. 2), and comes into the open position when it has reached the position 41b. On the other hand, the B-contact 40b of the withdrawal-amount sensing switch 40 is a contact that is in the closed position when the amount of withdrawal of the seatbelt 11 is greater than a set value and in the open position when it is less than the set value. More specifically, the B-contact 40b is in the open position until the moving part 41 of the withdrawal-amount sensing switch 40 comes from the position 41a to the position 41b, and comes into the closed position when it has reached the position 41b.

In this embodiment, the A-contact 40a of the withdrawal-amount sensing switch 40 corresponds to a third switch of the invention, and the B-contact 40b of the withdrawal-amount sensing switch 40 corresponds to a fourth switch of the invention. The buckle switch 30 and the withdrawal-amount sensing switch 40 of the embodiment correspond to a detection switch for sensing the state of use of the seatbelt 11.

The ECU 50 includes a central processing unit (CPU), a memory, an input/output unit and so on. The ECU 50 may recieve as input signals, information on the state of wearing of the seatbelt 11, information on the amount of the withdrawal of the seatbelt 11, information on the prediction and occurrence of the collision of the vehicle, information on the condition of driving of the vehicle, information on the position and physique of the occupant D seated in the vehicle seat S, information on the traffic situation of the surroundings, information on the weather and time zone and so on. The ECU 50 controls the motor 52 that drives (withdraws or retracts) the seatbelt 11 via a drive circuit 51 in response to the input signals. For example, it operates in the following control modes described below.

According to one embodiment of the invention, the motor 52 is rotated in one direction to withdraw the seatbelt 11 from the spool 22 in order to facilitate the withdrawal of the seatbelt 11 when the occupant D withdraws the seatbelt 11. The withdrawal of the seatbelt 11 by the occupant D can be detected by the A-contact 40a or the B-contact 40b of the withdrawal-amount sensing switch 40.

According to another embodiment of the invention, the motor 52 is rotated in the other direction to retract the seatbelt 11 in order to eliminate the looseness of the seatbelt 11 (to apply a specified tension to the seatbelt 11) when the occupant D has inserted the tongue 13 into the buckle 15. The insertion of the tongue 13 into the buckle 15 by the occupant D can be detected by the A-contact 30a or the B-contact 30b of the buckle switch 30.

According to another embodiment of the invention, the motor 52 is rotated in the other direction to retract the seatbelt 11 in order to restrain the occupant D to the vehicle seat S when the occurrence of an accident is detected with the seatbelt 11 in use.

According to one embodiment of the invention, the motor 52 is rotated in the other direction or one direction to retract or withdraw the seatbelt 11 in order to warn the occupant D when the occurrence of an accident has been predicted with the seatbelt 11 in use.

According to another embodiment of the invention, the motor 52 is rotated in the other direction to retract the seatbelt 11 so that the occupant D can easily store the seatbelt 11 when the occupant D draws the tongue 13 out from the buckle 15 (when the seatbelt 11 comes into a nonuse state). The fact that the occupant D has drawn the tongue 13 out from the buckle 15 (the seatbelt 11 has come into a nonuse state) can be sensed by the A-contact 30a or the B-contact 30b of the buckle switch 30.

The occupant D sometimes withdraws the seatbelt 11 to wear it but stops the wearing of the seatbelt 11 halfway. In this case, the seatbelt 11 must be stored. Accordingly, when the insertion of the tongue 13 into the buckle 15 is not sensed by the buckle switch 30 even if a set time (for example, tens of seconds) has passed after the withdrawal of the seatbelt 11 has been detected by the withdrawal-amount sensing switch 40, a determination is made that the wearing of the seatbelt 11 has been stopped and the motor 52 is rotated in the other direction to store the seatbelt 11, thereby retracting the seatbelt 11.

The ECU 50 can operate in other various control modes. The ECU 50 can control units other than the motor 52. In order to prevent the discharge of the car battery, the ECU 50 is generally constructed to be able to shift into a sleep mode as long as there is no interference with the control for the motor 52. The conditions to shift the ECU 50 into the sleep mode include that the ignition switch is in off mode (the engine is stopped) or the input signal (wake-up signal) is not inputted for more than a set time. The ECU 50 is constructed such that when a wake-up signal is inputted in a sleep mode, the sleep mode is cancelled to execute a specified control. The operation of shifting the ECU 50 to a sleep mode and canceling the sleep mode will be described later.

FIG. 3 shows the schematic structure of the control system of the seatbelt system 10 according to one embodiment of the invention. Power (a voltage Vc) for the vehicle-mounted units is supplied from a battery 101 and an alternator 102 driven by the engine. When the ignition is turned off, the engine that drives the alternator is stopped, so the power Vc is supplied only from the battery. In other words, the embodiment has power supply including at least the battery. The control system of the embodiment includes a detection-signal generating section and a wake-up-signal generating section.

The detection-signal generating section includes a first detection circuit 30A and a second detection circuit 30B for sensing the state of wearing the seatbelt 11 and a third detection circuit 40A and a fourth detection circuit 40B for sensing the amount of withdrawal of the seatbelt 11.

The first detection circuit 30A consists of a switching element (for example, a semiconductor switching element such as a field effect transistor (FET) or a transistor) 71a, a resistor 72a, and the A-contact 30a of the buckle switch 30. The control terminal of the switching element 71a connects to the output terminal of a latch circuit 73a. Accordingly, the switching element 71a is brought into a conductive mode or a nonconductive mode in response to the signal from the output terminal of the latch circuit 73a. When the switching element 71a comes into a conductive mode, a signal e at the node of the resistor 72a and the A-contact 30a outputs a signal corresponding to the operating condition of the A-contact 30a. A wearing detection signal (A-contact), which becomes low (L) level when the seatbelt 11 is in use and becomes high (H) level when the seatbelt 11 is not in use, is outputted. On the other hand, when the switching element 71a comes into a nonconductive mode, the signal e at the node of the resistor 72a and the A-contact 30a becomes L level.

The latch circuit 73a receives latched data outputted from the ECU 50 at a point in time when a latch signal is outputted from the ECU 50, and outputs a signal corresponding to the latched data from the output terminal. The latch circuit 73a holds the latched data. Accordingly, even when the ECU 50 shifts to a sleep mode, the switching element 71a is controlled in a state corresponding to the data latched in the latch circuit 73a.

The second detection circuit 30b consists of a switching element 71b, a resistor 72b, and the B-contact 30b of the buckle switch 30. The switching element 71b is brought into a conductive mode or a nonconductive mode in response to the signal from the output terminal of a latch circuit 73b. When the switching element 71b comes into the conductive mode, a signal f at the node of the resistor 72b and the B-contact 30b outputs a signal, corresponding to the operating condition of the B-contact 30b. A wearing detection signal (B-contact), which becomes H level when the seatbelt 11 is in use and becomes L level when the seatbelt 11 is not in use, is outputted. On the other hand, when the switching element 71b comes into a nonconductive mode, the signal f at the node of the resistor 72b and the B-contact 30b becomes L level. The latch circuit 73b receives latched data outputted from the ECU 50 at a point in time when a latch signal is outputted from the ECU 50, and outputs a signal corresponding to the latched data from the output terminal.

Also the A-contact 40a and the B-contact 40b of the withdrawal-amount sensing switch 40 is provided with the third detection circuit 40A and the fourth detection circuit 40B having the same structure as that of the first detection circuit 30A including the A-contact 30a and the second detection circuit 30B including the B-contact 30b of the buckle switch 30.

When the switching element of the third detection circuit 40A comes into a conductive mode in response to the output signal from the latch circuit, a signal m at the node of the resistor and the A-contact 40a outputs a signal corresponding to the operating condition of the A-contact 40a. That is, a withdrawal-amount detection signal (A-contact), which becomes L level when the amount of withdrawal of the seatbelt 11 is equal to or more than a set value and becomes H level when it is less than the set value, is outputted. The signal of the output terminal of the latch circuit is controlled by the ECU 50.

When the switching element of the fourth detection circuit 40B comes into a conductive mode in response to the output signal from the latch circuit, a signal n at the node of the resistor and the B-contact 40b outputs a signal corresponding to the operating condition of the B-contact 40b. That is, a withdrawal-amount detection signal (B-contact), which becomes H level when the amount of withdrawal of the seatbelt 11 is equal to or more than a set value and becomes L level when it is less than the set value, is outputted. The signal of the output terminal of the latch circuit is controlled by the ECU 50.

According to one embodiment of the invention, to detect that the contact changes from the closed position to the open position, a high current (e.g., a current of 5 mA) must be supplied constantly. To detect that the contact changes from the open position to the closed position, a low current (e.g., a very weak current like a leakage current) is enough. Accordingly, the embodiment is constructed such that the power is supplied to the contact in the open position and power is stopped being supplied to the contact in the closed position.

Figure 4:
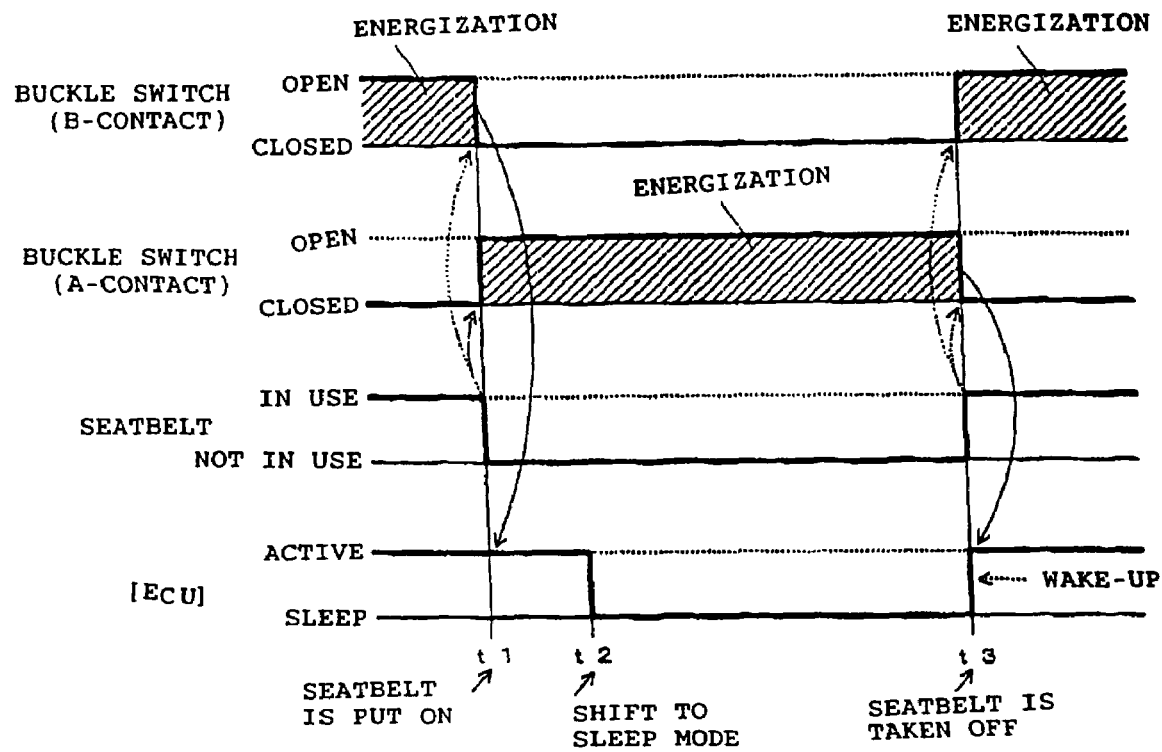
FIG. 4 is a diagram illustrating the operation of the control system of the vehicle-mounted seatbelt system according to one embodiment of the invention.

FIG. 4 shows the state of power supply (energization) to the A-contact 30a and the B-contact 30b of the buckle switch 30 according to one embodiment of the invention. As shown in FIG. 4, the ECU 50 controls the latch circuits 73a and 73b so that the switching element 71a is in a nonconductive mode and the switching element 71b is in a conductive mode until time t1 at which the seatbelt 11 is put on (while the seatbelt 11 in nonuse), respectively. Thus, power is supplied to the second detection circuit 30B including the B-contact 30b of the buckle switch 30, while power is stopped being supplied to the first detection circuit 30A including the A-contact 30a. At that time, the ECU 50 determines whether the seatbelt 11 has been put on based on the wearing detection signal (B-contact) f outputted from the second detection circuit 30B which is supplied with power.

When, at time t1, the state of the B-contact 30b from the open position to the closed position (the seatbelt 11 has been put on) is detected based on the wearing detection signal (B-contact) f outputted from the second detection circuit 30B, ECU 50 controls the latch circuits 73a and 73b to bring the switching element 71a into a conductive mode and the switching element 71b into a nonconductive mode, respectively. Thus, the power supply to the second detection circuit 30B including the B-contact 30b of the buckle switch 30 is stopped, while power is supplied to the first detection circuit 30A including the A-contact 30a of the buckle switch 30. At that time, the ECU 50 determines whether the seatbelt 11 is in a nonuse state with the wearing detection signal (A-contact) e outputted from the first detection circuit 30A which is supplied with power.

In this way, by supplying power to the detection circuit of the first detection circuit 30A and the second detection circuit 30B, which includes a contact in the open position and stopping power supply to the detection circuit including a contact in the closed position, the current flowing in the detection circuit can be decreased even when the ECU 50 has shifted to a sleep mode. For example, when the ECU 50 shifts to a sleep mode at time t2 with the seatbelt 11 in use, as shown in FIG. 4, the switching element 71a maintains a conductive mode in response to the output signal from the latch circuit 73a. Thus, power is continuously supplied to the first detection circuit 30A including the A-contact 30a in the open position.

When the seatbelt 11 enters a nonuse state at time t3 with the ECU 50 in a sleep mode, the A-contact 30a changes from the open position to the closed position and the wearing detection signal (A-contact) e changes from H-level to L-level. The change of the wearing detection signal (A-contact) e from H-level to L-level allows the wake-up signal to be inputted to the ECU 50, transferring the ECU 50 out of the sleep mode (i.e., waking up the ECU 50).

Also, when the ECU 50 shifts to a sleep mode while the seatbelt 11 is not in use, power is continuously supplied to the second detection circuit 30B including the B-contact 30b in the open position.

The state of the power supply (energization) to the A-contact 40a and the B-contact 40b of the withdrawal-amount sensing switch 40 is the same as that of the A-contact 30a and the B-contact 30b of the buckle switch 30. Specifically, the ECU 50 controls the latch circuits, i.e. the switching elements provided in the detection circuits, so that power is supplied to a detection circuit including a contact in the open position and power supply to a detection circuit including a contact in the closed position is stopped.

At that time, the ECU 50 determines whether the amount of withdrawal of the seatbelt 11 is equal to or more than a set value or less than the set value based withdrawal-amount detection signal outputted from the third detection circuit 40A or the fourth detection circuit 40B. The wake-up-signal generation section includes D-flip-flops 61 and 63, exclusive OR circuits (hereinafter, referred to as EX-OR circuits) 62 and 64, and an OR circuit 65.

An input signal a indicating that the ignition switch is in the on position is inputted to one input terminal of the EX-OR circuit 62 via a car LAN at specified intervals. The input signal a is sent to the car LAN from, for example, another ECU that monitors the condition of the ignition switch. The other input terminal of the EX-OR circuit 62 connects to an output terminal Q of the D-flip-flop 61. An inverted output terminal Q' of the D-flip-flop 61 connects to a data terminal D. The output terminal of the EX-OR circuit 62 connects to a clock terminal CK of the D-flip-flop 61.

One input terminal of the EX-OR circuit 64 receives the detection signals e, f, m, and n outputted from the first to fourth detection circuits 30A, 30B, 40A, and 40B which are supplied with power. At that time, it is determined whether the detection signals e, f, m, and n are inputted to the EX-OR circuit 64 as they are or in reverse, depending on the operation of the D-flip-flop 63. The other input terminal of the EX-OR circuit 64 connects to an output terminal Q of the D-flip-flop 63. An inverted output terminal Q' of the D-flip-flop 63 connects to a data terminal D. The output terminal of the EX-OR circuit 64 connects to a clock terminal CK of the D-flip-flop 63. The input of the detection signals e, f, m, and n to the EX-OR circuit 64 may be made through switching circuits that are synchronously controlled with the switching elements disposed in the detection circuits 30A, 30B, 40A, and 40B.

The output signal d of the EX-OR circuit 62 and the output signal j of the EX-OR circuit 64 are inputted to the wake-up-signal input terminal of the ECU 50 as wake-up signals through the OR circuit 65.

The ECU 50 shifts to a sleep mode when the wake-up signal is not inputted to the wake-up-signal input terminal for more than the set time. On the other hand, a sleep mode is canceled when the wake-up-signal is inputted to the wake-up-signal input terminal when the ECU 50 is in a sleep mode. Here the transmission interval of the input signal a is set shorter than the set time before the ECU 50 shifts to a sleep mode.

Figure 6:
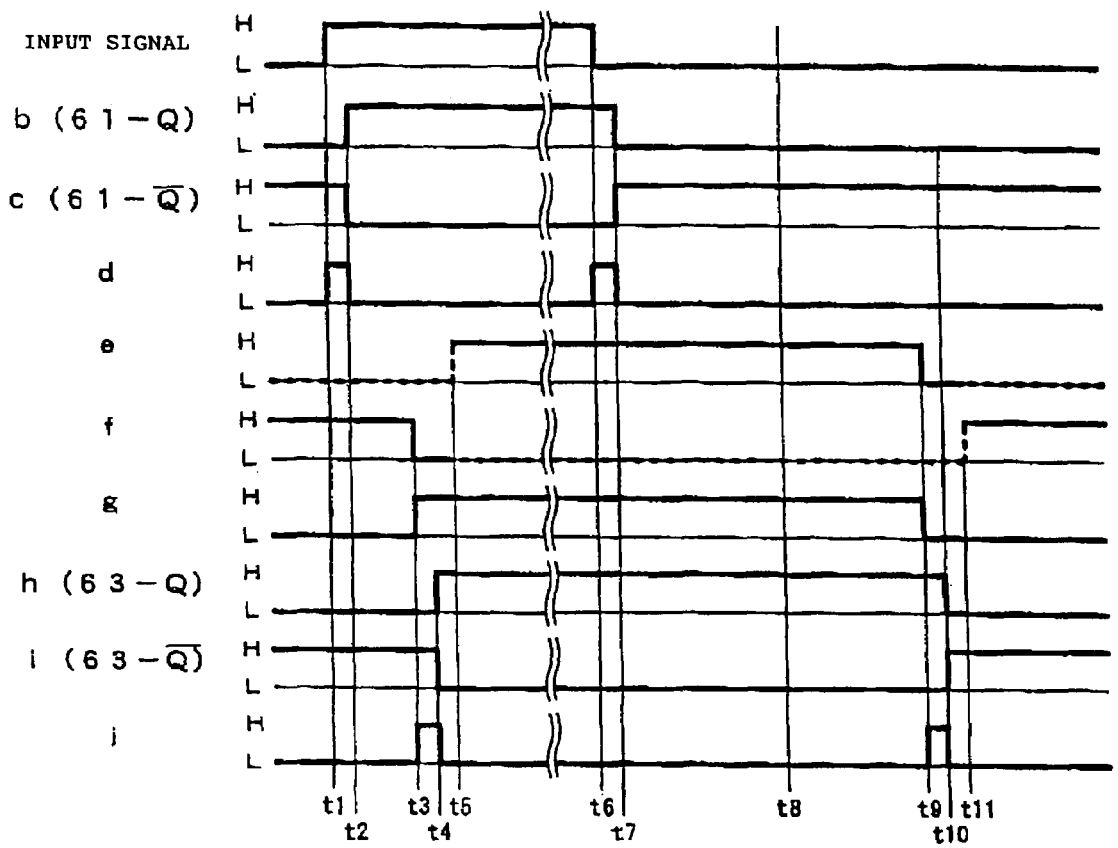
FIG. 6 is a diagram showing the state of the signals of the control system of the vehicle-mounted seatbelt system according to one embodiment of the invention.

The change of the signals a to j will now be described with reference to FIG. 6. FIG. 6 does not show the change of the detection signals m and n. In the initial state, the output signals b and h of the output terminals Q of the D-flip-flops 61 and 63 are at L level; the output signals c and i of the inverted output terminals Q' are at H level.

When the input signal a is inputted in this state, the input signal d of the EX-OR circuit 62 rises from L level to H level at time t1 at which the input signal a rises from L level to H level. At that time, the output signal c is at H level, so that the state of the D-flip-flop 61 is switched to change the output signal b to H level and the output signal c to L level. Since the output signal c changes to H level at time t2, the output signal d falls from H level to L level. Thus the pulsed output signal d is inputted from the EX-OR circuit 62 to the ECU 50 through the OR circuit 65 as a wake-up signal.

When the input signal a falls from H level to L level at time t6, the output signal d rises from L level to H level. At that time, the output signal c is at L level, so that the state of the D-flip-flop 61 is switched to change the output signal b to L level and the output signal c to H level. Since the output signal c changes to H level at time t7, the output signal d falls from H level to L level. Thus, the pulsed output signal d is inputted from the EX-OR circuit 62 to the ECU 50 through the OR circuit 65 as a wake-up signal.

Also an input signal g of the EX-OR circuit 64 changes with the change of the wearing detection signal (A-contact) e or the wearing detection signal (B-contact) f due to the wearing or nonwearing of the seatbelt 11. The part of the wearing detection signals e and f indicated by the broken lines in FIG. 6 shows a state in which no power is supplied to the detection circuits.

The state of the D-flip-flop 63 is switched with the change of the input signal g that is inverted from the wearing detection signal f, and the output signal j of the EX-OR circuit 64 is inputted to the ECU 50 through the OR circuit 65 as a wake-up signal. In this case, since a wake-up signal responsive to the input signal a is inputted at specified intervals, the wake-up signal corresponding to the output signal j does not change the mode of the ECU 50. In the example of FIG. 6, the wearing detection signal (B-contact) e is used as the input signal g without being processed with the seatbelt 11 in use.

As shown in FIG. 6, the ignition key is tuned off with the seatbelt 11 in use and the input signal a is not inputted for more than a specified time from time t7. Thus, the ECU 50 shifts to a sleep mode. At that time, power is continuously supplied to the first detection circuit 30A while the ECU 50 is in sleep mode.

When the occupant takes off the seatbelt 11 at time t9, the wearing detection signal (A-contact) e changes from H level to L level. In the example of FIG. 3, the wearing detection signal (A-contact) e is used as the input signal g. Accordingly, when the wearing detection signal (A-contact) e changes from H level to L level, also the input signal g falls from H level to L level. At that time, the output signal h of the D-flip-flop 63 is at H level, so that the output signal j of the EX-OR circuit 64 rises from L level to H level. Since the output signal i is at L level, the state of the D-flip-flop 61 is switched to change the output signal h to L level and the output signal i to H level. Since the output signal h changes to L level at time t10, the output signal j falls from H level to L level. Thus, the pulsed output signal j is inputted from the EX-OR circuit 64 to the ECU 50 through the OR circuit 65 as a wake-up signal. The sleep mode of the ECU 50 is thus cancelled.

The operation depending on the change of the A-contact 40a and the B-contact 40b of the withdrawal-amount sensing switch 40 is the same. Specifically, the ECU 50 is released from the sleep mode when it has been shifted to the sleep mode and then any of the A-contact 30a and the B-contact 30b of the buckle switch 30 and the A-contact 40a and the B-contact 40b of the withdrawal-amount sensing switch 40, which are supplied with power, changes.

Figure 5:
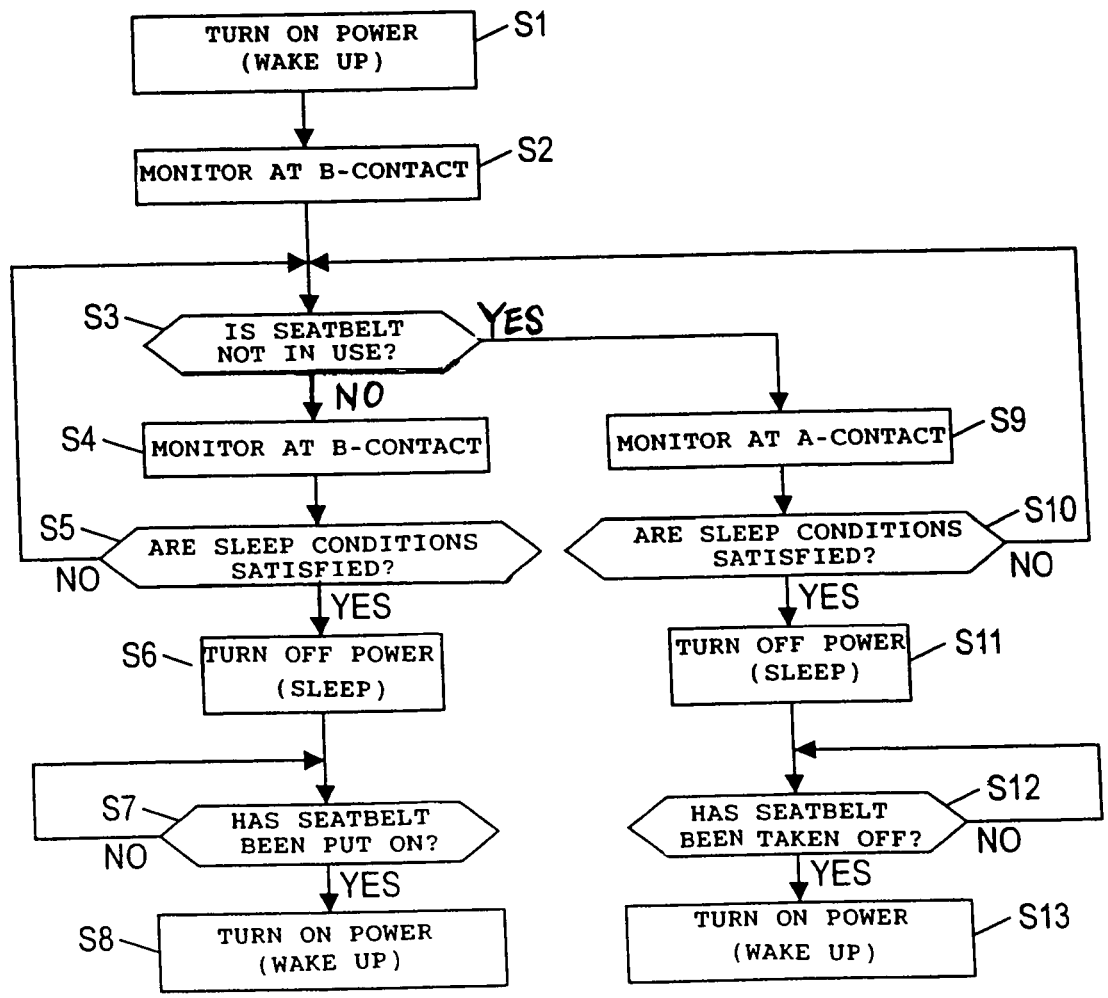
FIG. 5 is a flowchart for the operation of the control system of the vehicle-mounted seatbelt system according to one embodiment of the invention.

The operation of the ECU 50, according to one embodiment of the present invention, will now be described with reference to the flowchart of FIG. 5. The flowchart in FIG. 5 is for the case in which the wearing state of the seatbelt is detected. When the wake-up conditions including the on-position of the ignition key are satisfied with the ECU 50 in a sleep mode, the ECU 50 wakes up in step S1. In step S2, the ECU 50 first supplies power to the second detection circuit 30B to monitor (sense) the state of wearing of the seatbelt 11 with the B-contact 30b of the buckle switch 30 provided in the second detection circuit 30B.

In step S3, it is determined whether the seatbelt 11 is not in use, wherein when the seatbelt 11 is not in use, the program moves to step S4; when the seatbelt 11 is in use, the program moves to step S9. In step S4, a determination is made to monitor the state of wearing of the seatbelt 11 with the second detection circuit 30B including the B-contact 30b because the seatbelt 11 is not in use.

In step S5, it is determined whether the sleep conditions of the ECU 50 are satisfied (for example, whether the ignition switch has been turned off or whether no wake-up signal has been inputted for a set time). When the sleep conditions are not satisfied, the procedure returns to step S3; when the sleep conditions are satisfied, the procedure proceeds to step S6. In step S6, the ECU 50 shifts to a sleep mode.

In step S7, it is determined whether conditions for canceling the sleep-mode have been satisfied (whether the seatbelt 11 has been put on in the example of FIG. 5). The determination of whether the seatbelt 11 has been put on is made by the B-contact 30b of the buckle switch 30 included in the second detection circuit 30B. Accordingly, the determination on whether the seatbelt 11 has been put on can be made with a very weak current. When the seatbelt 11 has not been put on, the sleep mode is continued; when the seatbelt 11 has been put on, the procedure proceeds to step S8.

In step S8, the ECU 50 cancels the sleep mode and executes a control operation for the seatbelt in use. After the process of step S8 has been executed, the procedure returns to step S3.

In step S9, the power supply to the second detection circuit 30B is stopped because the seatbelt 11 is in use, and power is supplied to the first detection circuit 30A to monitor (sense) the nonuse state of the seatbelt 11 with the A-contact 30a in the first detection circuit 30A.

In step S10, it is determined whether the sleep conditions of the ECU 50 are satisfied, wherein when the sleep conditions are not satisfied, the procedure returns to step S3; when the sleep conditions are satisfied, the procedure proceeds to step S11.

In step S11, the ECU 50 shifts to a sleep mode.

In step S12, it is determined whether the conditions for canceling a sleep mode have been satisfied (whether the seatbelt 11 has been taken off in the example of FIG. 5). The determination on whether the seatbelt 11 has been taken off is made by the A-contact 30a of the buckle switch 30 included in the first detection circuit 30A. Accordingly, the determination on whether the seatbelt 11 has been taken off can be made with a very weak current. When the seatbelt 11 has not been taken off, the sleep mode is continued; when the seatbelt 11 has been taken off, the procedure proceeds to step S13.

In step S13, the ECU 50 cancels the sleep mode and executes a control operation for the seatbelt in the nonuse state. After the process of step S13 has been executed, the procedure returns to step S3.

Described above is a case in which the sleep mode of the ECU 50 is cancelled depending on whether the seatbelt 11 has been put on (the B-contact 30b of the buckle switch 30 has changed from the opened position to the closed position) or whether the seatbelt 11 has been taken off (the A-contact 30a of the buckle switch 30 has changed from the open position to the closed position). According to one embodiment of the invention, the sleep mode of the ECU 50 can also be cancelled depending on whether the amount of withdrawal of the seatbelt 11 is equal to or more than a set value or less than that.

For example, when the ECU 50 has shifted to a sleep mode with the seatbelt 11 in use, it is preferable to cancel the sleep mode of the ECU 50 when the seatbelt 11 has been taken off. In this case, the nonuse state of the seatbelt 11 is detected by the A-contact 30a of the buckle switch 30 and so the sleep mode of the ECU 50 is cancelled. The ECU 50 then rotates the motor 52 in the other direction to facilitate storing the seatbelt 11, thereby retracting the seatbelt 11. When the fact that the amount of withdrawal of the seatbelt 11 has become less than a set value is sensed at the A-contact 40a of the withdrawal-amount sensing switch 40, the motor 52 is stopped to stop retracting the seatbelt 11.

On the other hand, when the ECU 50 has shifted to a sleep mode with the seatbelt 11 not in use, it is preferable to cancel the sleep mode of the ECU 50 when the seatbelt 11 is withdrawn for wearing. In this case, the fact that the amount of the withdrawal of the seatbelt 11 has become equal to or more than a set value is detected by the B-contact 40b of the withdrawal-amount sensing switch 40 and so the sleep mode of the ECU 50 is cancelled. When the wearing of the seatbelt 11 is detected at the B-contact 30b of the buckle switch 30, the motor 52 is rotated in the other direction to eliminate the looseness of the seatbelt 11, thereby retracting the seatbelt 11. On the other hand, when the wearing of the seatbelt 11 is not detected at the B-contact 30b of the buckle switch 30 at a point in time after a lapse of a predetermined set time after the amount of withdrawal has become equal to or more than a set value, it is determined that the wearing of the seatbelt 11 has been stopped. Then the motor 52 is rotated in the other direction to facilitate the storage of the seatbelt 11, thereby retracting the seatbelt 11.

In the above description, of the detection circuit including the A-contact and the detection circuit including the B-contact of the detection switch, a detection circuit including a contact in the open position is supplied with power, and power supply to a detection circuit including a contact in the closed position is stopped. However, the power supply to a detection circuit including a contact in the closed position can be stopped also when the ECU 50 is in a sleep mode.

In this case, a contact in the closed or open position is determined while the ECU 50 is in operation, and when it shifts to a sleep mode, power supply to a detection circuit including a contact in the closed position is stopped, and a detection circuit including a contact in the open position is supplied with power. The invention may employ methods in which power is supplied to one or both of the detection circuits including the A-contact and the detection circuit including the B-contact during the period until the ECU 50 shifts to a sleep mode (normally operating period).

Figure 7:
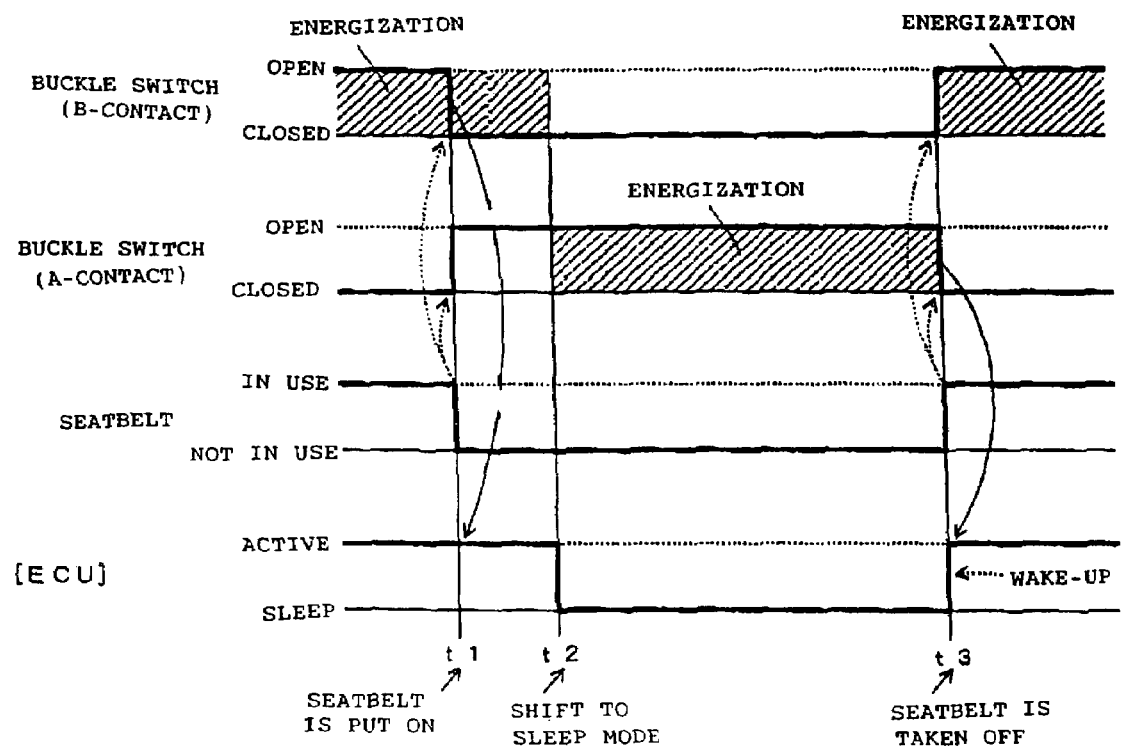
FIG. 7 is a diagram illustrating another operation of the control system of the vehicle-mounted seatbelt system according to one embodiment of the invention.

FIG. 7 shows the state of the power supply (energization) to the A-contact 30a and the B-contact 30b of the buckle switch 30. Referring to FIG. 7, the second detection circuit 30B having the B-contact 30b is supplied with power and the first detection circuit 30A having the A-contact 30a is not supplied with power irrespective of the state of wearing the seatbelt during the period in which the ECU 50 shifts to a sleep mode (normally operating period). The ECU 50 always determines which of the A-contact 30a and the B-contact 30b is in the open position.

The ECU 50 determines a contact in the open position at time t2 when the ECU 50 shifts to a sleep mode. In this case, it is determined that the A-contact 30a is in the open position because the seatbelt 11 is in use. Accordingly, power is supplied to the first detection circuit 30A including the A-contact 30a, and the power supply to the second detection circuit 30B including the B-contact 30b is stopped.

When the A-contact 30a of the first detection circuit 30A changes from the open position to the closed position with the ECU 50 is in a sleep mode, the sleep mode of the ECU 50 is cancelled by the above-described way.

The state of the power supply (energization) to the A-contact 40a and the B-contact 40b of the withdrawal-amount sensing switch 40 can also be controlled similarly to the state of the power supply to the A-contact 30*a* and the B-contact 30*b* of the buckle switch 30.

Specifically, power is supplied to one or both of the third detection circuit 40A including the A-contact 40*a* and the fourth detection circuit 40B including the B-contact 40*b* while the ECU 50 normally operates. When the ECU 50 shifts to a sleep mode, power is supplied to a detection circuit including a contact in the open position, and the power supply to a detection circuit including a contact in the closed position is stopped.

When the ECU shifts to a sleep mode, a detection circuit including a contact in the open position is supplied with power, and power supply to a detection circuit including a contact in the closed position is stopped, as described above. Therefore, the current flowing in the detection circuits can be reduced with the ECU 50 in a sleep mode. Also the need for the process of switching the power supply to the detection circuits is eliminated while the ECU 50 is in normal operation. Consequently, the process load on the ECU 50 can be reduced. The seatbelt system, according to one embodiment of the invention, can also be applied to child restraint systems CRS mounted to vehicle seats.

Figure 8:
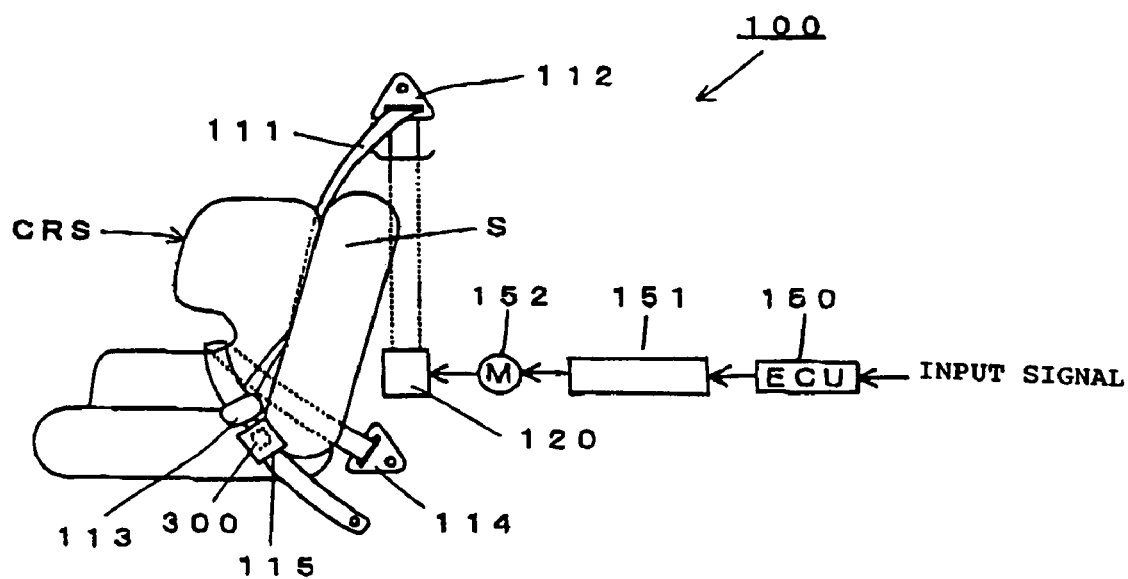
FIG. 8 is a diagram showing a state in which a child restraint system is mounted to the vehicle-mounted seatbelt system according to one embodiment of the invention.

FIG. 8 shows a state in which the child restraint system CRS is mounted to the seatbelt system of the embodiment. An example of the operation of mounting the child restraint system CRS to the vehicle seat S will be described below. A seatbelt 111 is withdrawn and disposed as shown in FIG. 8, with the child restraint system CRS mounted on the vehicle seat S. A tongue 113 is inserted into a buckle 115. Thus a buckle switch 300 operates.

The buckle switch 300, as the buckle switch 30 shown in FIG. 1, includes an A-contact that is in the open position when the seatbelt 111 is in use and is in the closed position when the seatbelt 111 is not in use, and a B-contact that is in the closed position when the seatbelt 111 is in use and is in the open position when the seatbelt 111 is not in use. The buckle switch 300 further includes a first detection circuit including the A-contact and a second detection circuit including the B-contact. Power supply to the first detection circuit and the second detection circuit can be executed by the above-described method.

When the state of wearing of the seatbelt 111 is sensed by the operation of the buckle switch 300, an ECU 150 controls a motor 152 via a drive circuit 151 to retract the seatbelt 111, in order to mount the child restraint system CRS to the vehicle seat S with the seatbelt 111.

When the nonuse state of the seatbelt 111 is sensed by the operation of the buckle switch 300, the ECU 150 controls the motor 152 to facilitate storing the seatbelt 11, thereby retracting the seatbelt 111. The ECU 150 supplies power to the first detection circuit or the second detection circuit whose contact is in the open position. The operation of the ECU 150 in a sleep mode and the cancel operation of the sleep mode are the same as the above-described operation. The above-described withdrawal-amount detection switch can also be used.

The invention is not limited to the structure of the embodiment but various modifications, additions, and deletions can be made. For example, although the buckle switch and the withdrawal-amount detection switch are used as detector to determine whether the seatbelt is in use or not in use, only one of them may be used. The detector to determine whether the seatbelt is in use or not in use may be various switches other than the buckle switch and the withdrawal-amount detection switch. The foregoing seatbelt system can be applied to protect an occupant seated in any seat in a car.

The structure of the seatbelt system is not limited to the aforementioned structure of the embodiment but other various structures can be employed. The drive unit may be any type of drive unit other than the motor. The detector for detecting the state of use of the seatbelt may be various detectors other than the buckle switch and the withdrawal-amount detection switch. For example, a tension sensor for sensing the tension applied to the seatbelt may be used. The conditions for shifting the ECU to a sleep mode and the conditions for canceling the sleep mode are not limited to those described in the forgoing embodiment but may employ various conditions.

While there has been described a car including a power supply having an alternator driven by an engine and a battery, the invention may also be applied to cars including a power supply having only a battery (for example, electric vehicles and fuel-cell powered vehicles). While there has been described a seatbelt system mounted to cars, the invention can be applied to a seatbelt system mounted to various vehicles such as an aircraft, a vessel, a train, and an airplane other than a car.

The invention can be applied to various protection systems for protecting the occupant of a vehicle, other than the seatbelt system. In this case, a detector for sensing the condition of use of the protection system is selected as appropriate depending on the object to be protected.

While there has been described a vehicle-occupant protection system mounted to a vehicle, the invention is not limited to the protection system for protecting the occupant but can be applied to various systems mounted to a vehicle. For example, the invention can be applied to, e.g., an electric door mounted to a vehicle. In this case, in place of the detector for detecting the condition of use of the protection system, a detector for detecting the condition of use of vehicle-mounted systems is used. The invention can be constructed as a vehicle-mounted system.

The above described invention has several advantages. According to one embodiment of the vehicle occupant protection system, the detector consists of a first detection circuit including a first switch and a second detection circuit including a second switch, and power supply to the detection circuits can be stopped during the period in which high current must be supplied to the detection circuits (while the switch is in the closed position). Thus, the current to be supplied to the detector can be reduced.

According to another embodiment of the invention, the vehicle occupant protection system is constructed to be able to stop power supply to the detection circuits during the period in which a large current must be supplied to the detection circuits and the controller is in a sleep mode. Thus, the current to be supplied to the detection circuits can be reduced during the period in which the controller is in a sleep mode, for which reduction of the current to be supplied to the detector is desired.

According to another embodiment of the invention, the use of the vehicle occupant protection system facilitates wake-up (canceling the sleep mode) of the controller while reducing the current flowing in the detector with the controller in a sleep mode. According to another embodiment of the invention, the use of the vehicle occupant protection system can reduce the current to be supplied to the detector for sensing the state of use of the seatbelt.

According to another embodiment of the invention, the use of the vehicle occupant protection system can reduce the current to be supplied to the detector for sensing the state of withdrawal and the state of wearing of the seatbelt. Since the drive unit is controlled depending on at least one of the state of withdrawal and the state of wearing of the seatbelt, the seatbelt can be controlled in detail.

The priority application, Japanese Patent Application 2004-368233 filed Dec. 20, 2004, is incorporated by reference herein in its entirety.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A vehicle occupant protection system comprising:
a protection system for protecting an occupant;
a drive unit for driving the protection system;
a detector for determining whether the protection system is in use or not in use;
a controller for controlling the drive unit in response to a detection signal outputted from the detector; and
a power unit including at least a battery,
wherein the detector has a first detection circuit including a first switch that is in an open position when the protection system is in use and is in a closed position when the protection system is not in use, and a second detection circuit including a second switch that is in the closed position when the protection system is in use and is in the open position when the protection system is not in use, wherein a power supply from the power unit to the first detection circuit is stopped when the protection system is not in use, and the power supply from the power unit to the second detection circuit is stopped when the protection system is in use; and
wherein the controller controls the drive unit in response to the detection signal outputted from the one of the first detection circuit or the second detection circuit that is supplied with power.

2. The vehicle occupant protection system according to claim 1, wherein,
the controller shifts to a sleep mode when sleep conditions are satisfied; and
the power supply to the first detection circuit is stopped when the protection system is not in use and the controller is in said sleep mode, and the power supply to the second detection circuit is stopped when the protection system is in use and the controller is in said sleep mode.

3. The vehicle occupant protection system according to claim 2, wherein when the controller is in said sleep mode, said sleep mode is cancelled in response to a detection signal outputted from the one of the first detection circuit or the second detection circuit that is supplied with power.

4. The vehicle occupant protection system according to claim 1, wherein,
the protection system is a seatbelt capable of restraining an occupant to a vehicle seat;
the drive unit generates driving force for retracting the seatbelt; and
the first switch is in the open position when the seatbelt is in use and in the closed position when the seatbelt is not in use, and the second switch is in the closed position when the seatbelt is in use and in the open position when the seatbelt is not in use.

5. The vehicle occupant protection system according to claim 4, wherein,
the detector further includes a third detection circuit and a fourth detection circuit;
the first switch is in the open position when a tongue of the seatbelt is in engagement with a buckle and in the closed position when the tongue is out of engagement with the buckle, and the second switch is in the closed position when the tongue of the seatbelt is in engagement with the buckle and in the open position when the tongue is out of engagement with the buckle; and the power supply to the first detection circuit is stopped when the tongue of the seatbelt is out of engagement with the buckle, and the power supply to the second detection circuit is stopped when the tongue of the seatbelt is in engagement with the buckle;
the third detection circuit includes a third switch that is in the open position when the amount of withdrawal of the seatbelt is equal to or more than a set value and in the closed position when the amount of withdrawal of the seatbelt is less than the set value, and the fourth detection circuit includes a fourth switch that is in the closed position when the amount of withdrawal of the seatbelt is equal to or more than a set value and in the open position when the amount of withdrawal of the seatbelt is less than the set value, wherein the power supply to the third detection circuit from the power unit is stopped when the amount of withdrawal of the seatbelt is less than the set value, and the power supply to the fourth detection circuit from the power unit is stopped when the amount of withdrawal of the seatbelt is equal to or more than the set value; and
the controller controls the drive unit in response to at least one of a detection signal outputted from the first detection circuit or the second detection circuit that is supplied with power and a detection signal outputted from the third detection circuit or the fourth detection circuit that is supplied with power.

6. A vehicle comprising:
a vehicle occupant protection system including:
a protection system for protecting an occupant;
a drive unit for driving the protection system;
a detector for determining whether the protection system is in use or not in use;
controller for controlling the drive unit in response to a detection signal outputted from the detector; and
a power unit including at least a battery, wherein,
the detector has a first detection circuit including a first switch that is in the open position when the protection system is in use and is in the closed position when the protection system is not in use, and a second detection circuit including a second switch that is in the closed position when the protection system is in use and is in the open position when the protection system is not in use, wherein a power supply from the power unit to the first detection circuit is stopped when the protection system is not in use, and the power supply from the power unit to the second detection circuit is stopped when the protection system is in use; and
the controller controls the drive unit in response to the detection signal outputted from the one of the first detection circuit or the second detection circuit that is supplied with power.

* * * * *